(12) United States Patent
Bromage et al.

(10) Patent No.: US 6,239,866 B1
(45) Date of Patent: May 29, 2001

(54) TEMPORAL MEASUREMENTS OF ULTRASHORT FAR INFRARED ELECTROMAGNETIC PULSES

(75) Inventors: Jake Bromage, Rochester; Ian Walmsley, Lyons, both of NY (US)

(73) Assignee: The University of Rochester, Rochester, NY (US)

( * ) Notice: Subject to any disclaimer, the term of this patent is extended or adjusted under 35 U.S.C. 154(b) by 0 days.

(21) Appl. No.: 09/348,208

(22) Filed: Jul. 8, 1999

Related U.S. Application Data
(60) Provisional application No. 60/092,351, filed on Jul. 10, 1998.

(51) Int. Cl.[7] .................................................... G01C 3/08
(52) U.S. Cl. ........................ 356/5.01; 356/5.05; 356/5.08
(58) Field of Search ........................ 356/4.01, 5.01–5.08

(56) References Cited

U.S. PATENT DOCUMENTS 5,489,984 * 2/1996 Hariharan et al. .................... 356/360
5,585,913 * 12/1996 Hariharan et al. ................... 356/4.09

OTHER PUBLICATIONS

N. Katzenellenbogen and D. Grischkowsky, in Ultra Wideband, Short Pulse Electromagnetics. Proceedings of an International Conference, p. xi+542, 1993.

G. Mourou, C.V. Stancampiano, and D. Ny Usa Blumenthal, in Applied Physics Letters 38 (6), 470–2, 1981.

F.G. Sun, G.A. Wagoner, and X.C. Zhang, in Applied Physics Letters 67 (12), 1656–8, 1995.

D. You, R.R. Jones, P.H. Bucksbaum et al., in Optical Letters 18 (4), 290–2, 1993.

* cited by examiner

Primary Examiner—Stephen C. Buczinski
(74) Attorney, Agent, or Firm—Martin Lukacher; Kenneth J. Lukacher

(57) ABSTRACT

Dithered-edge sampling (DES) enables ultra-wideband measurement of terahertz pulses (far infrared electromagnetic pulses) using photoconductive antennas. The terahertz pulse is sampled by first passing it through a triggered photoconductive attenuator whose fast attenuation edge (limited only by the duration of the optical gating pulse) is dithered in time. A slow photoconductive receiver then measures the component of the terahertz electric field that is modulated at the dither frequency. The current through the photoconductive element constituting the receiver passes through a locking amplifier which may be operated at dither frequency. When used alone, the receiver blurs the measured terahertz pulse width. However, the increased time resolution provided by DES enables measurement of source-limited terahertz pulse widths. In addition, DES may be used to make direct measurements of a photoconductive receiver's temporal response.

13 Claims, 2 Drawing Sheets

TEMPORAL MEASUREMENTS OF ULTRASHORT FAR INFRARED ELECTROMAGNETIC PULSES

This application claims the priority benefit of U.S. Provisional Application, Ser. No. 60/092,351 filed Jul. 10, 1998.

DESCRIPTION

The present invention relates to a system (method and apparatus) for making temporal measurements of ultrashort far infrared electromagnetic pulses (hereinafter referred to as terahertz or THz pulses) which may be, for example, sub picosecond pulses, which in the frequency domain, may be in the terahertz (THz) frequency range. The term "electromagnetic" includes "optical," whether or not visible. More particularly, the present invention provides a photoconductive sampling system for THz pulse measurement which decouples the sensitivity and bandwidth requirements of the measurement through the use of a triggered photoconductive attenuator and a photoconductive detector or receiver, both synchronously operated by optical pulses. The attenuator provides a rapid decrease in transmission ("turn-on"). The attenuator, by virtue of its rapid turn-on, provides the bandwidth requisite for terahertz pulse sensitivity, while the photoconductive receiver provides requisite measurement sensitivity. Inasmuch as the receiver is not responsible for the temporal resolution of the system, the temporal response of photoconductive receivers may be measured directly by utilizing them in the system.

Heretofore, ultrashort pulse measurements were carried out by photoconductive sampling (PCS) and electro-optic sampling. In both such techniques there is a trade off between sensitivity and bandwidth. In photoconductive sampling, bandwidth is a function of the photoconductive material carrier lifetime, which affects the mobility of the carriers in the photoconductive material. The optical antenna geometry of the receiver also controls the sensitivity and bandwidth. In electro-optical sampling, a nonlinear crystal is used, of a length, which determines the resolution and sensitivity of the measurement. For example, the signal measured by photoconductive sampling PCS is the cross correlation of the THz electric field (E) and the response of the receiver (R). The PCS signal (S) τ is shown in the following equation:

$$S(\tau) = \int_{-\infty}^{+\infty} E(t) R(t - \tau) dt \quad (1)$$

where τ is the delay between the arrival of the THz pulse at the receiver, and the optical pulse which actuates the receiver.

THz pulse measurements have heretofore used the edges of control or sync pulses to gate the onset of photo conductivity of a photoconductive switch element (a so-called photoconductive attenuator) to provide temporal resolution. Such techniques measured only the integrated power of the THz pulse. To obtain the magnitude of the electric field, but not the phase, a numerical derivative had to be performed which tightly constrained the signal to noise ratio.

In accordance with the present invention the sync optical pulse activates the photo conductive attenuator, but the delay of the sync optical pulse to the attenuator is modulated. For example, the delay of the optical trigger pulse is modulated at a rate of from 40 to 100 Hz, for example, with an amplitude of 100 fs.

If a THz pulse is incident on such an attenuator, the transmitted electric field if given by E(t) G(t–τ$_G$), where E(t) is the electric field of the incident pulse, and G (t–τ$_G$) is the attenuator's time-dependent transmissivity or 'edge function', with the edge occurring at time τ$_G$. The transmitted THz pulse is then measured using a receiver with a temporal response R (t–τ$_R$) where τ$_R$ is the delay between the time of arrival of the THz pulse and the receiver's optical gate pulse.

The photocurrent signal is given by, $$S(\tau_G, \tau_R) = \int_{-\infty}^{\infty} E(t) G(t - \tau_G) R(t - \tau_R) dt. \quad (2)$$

E(t) is recovered from this signal in the following way. The time at which the edge occurs, τ$_G$, is modulated at frequency Ω with amplitude δτ, so τ$_G$=τ$_0$–δ cos(Ωt). Also, the receiver trigger time, τ$_R$, is set so that the maximum of the receiver's response, R, is coincident with the rapid decrease in G, (i.e., τ$_R$=τ$_0$+τ$_1$). In addition, a lock-in amplifier is used to measure the component of S that is modulated at the dither frequency, Ω. One can obtain an expression for this component if one replaces G with a taylor expansion in δτ cos (Ωt) about t–τ$_0$, and keeps terms modulated at dither frequency. For samll dither amplitudes this signal is $$S_\Omega(\tau_0, \tau_1) = \delta\tau \int_{-\infty}^{\infty} E(t) G'(t - \tau_0) R(t - \tau_0 - \tau_1) dt, \quad (3)$$

where G'(t) is the derivative of G(t) with respect to time. If the drop in the edge function occurs sufficiently quickly, its derivative is a narrow sampling window centered on the time τ$_0$. In the limit of an extremely rapid edge, G' becomes a delta function. Then S$_\Omega$(τ$_0$,τ$_1$) is given by, $$S_\Omega(\tau_0, \tau_1) = \delta\tau E(\tau_0) R(-\tau_1). \quad (4)$$

To map out the electric field E, one slowly varies τ$_0$; to map out the receiver response, R, one slowly varies τ$_1$. In this way, the speed of the attenuator combined with the high sensitivity of the gated photoconductive receiver allows one to sample THz pulses with a much finer temporal resolution than is provided by the receiver alone.

Accordingly, it is the principal object of the present invention to provide an improved system for measuring optical pulses, and particularly pulses in the terahertz (100 fs) range.

The foregoing and other objects and features of the invention will become more apparent from a reading of the following description in connection with the accompanying drawings wherein.

Figure 1:
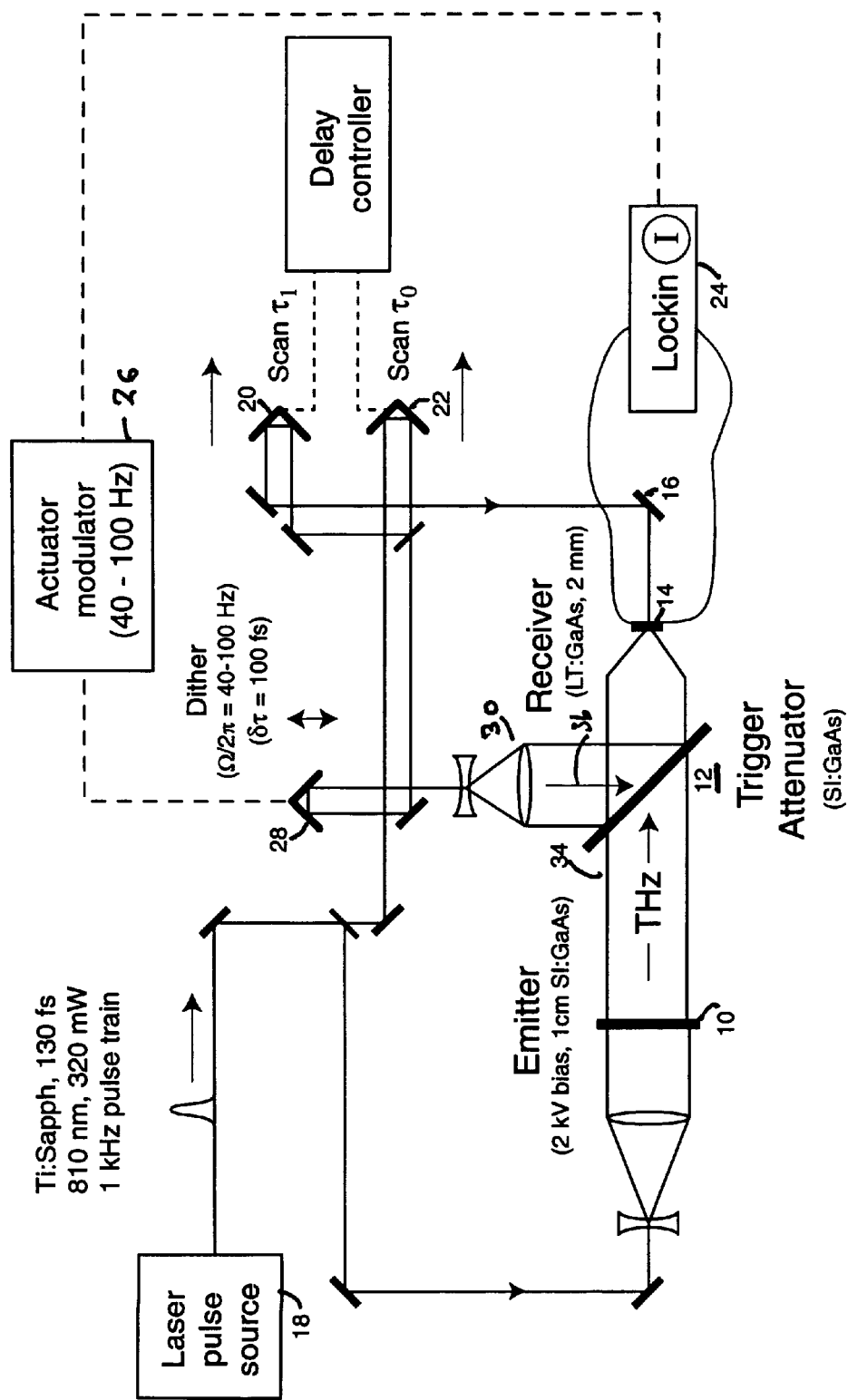
FIG. 1 is a schematic diagram of a system embodying the invention.

Referring to FIG. 1, the system provided by the invention has three major components: an emitter 10, a triggered attenuator 12, and a receiver 14. The nature of the devices of the emitter, triggered attenuator and receiver and of the pulse from a laser pulse source 18 to be measured are given in FIG. 1 by way of example and not by limitation on the scope of the invention. All of the major components are activated by the optical sync pulses at synchronous times that are controlled using two delay stages 20 and 22, marked scan $\tau_0$ and scan $\tau_1$ in FIG. 1. The emitter 10 and receiver 14 may be large aperture photoconductive antennas as described in an article by Jake Bromage, S. Radic, G. P. Agrawal et. al., in *Optics Letters*, 22(9), 627–9(1997). The THz pulse being measured is produced indirectly by triggering the photoconductive emitter 10 which is biased to cut-off with DC voltage from a source, not shown. The pulses synchronizing the system are from the laser pulse source 18, which may provide 20 Micro-Joule ($\mu$J) optical pulses. This source may be an ultrafast laser such as a titanium sapphire laser system.

The THz pulses from the emitter 10 propagate through the triggered attenuator 12, provided by a wafer 34 of photoconductive material, towards the receiver. The receiver 14 is gated, via the stages 20 and 22 and a fold mirror 16, with a optical sync pulses from the laser pulse source 18 that makes the receiver sensitive to the electric field of the THz pulse from the emitter 10 for a few picoseconds, thereby producing a photo current in the receiver that is measured with a locking amplifier 24. The locking signal is a signal at the dither frequency from an actuator modulator 26 which controls a dither or delay modulator stage 28, and synchronous therewith. The current through the locking amplifier 24 is measured as indicated by the standard symbol for current measurement device which is "I" in a circle.

In operation, the triggered attenuator 12, which is for example made from a conductive material (a SI:GaAs wafer) is activated by a 50 $\mu$J optical pulse which is passed through the dithering delay stage 28 after passing through the scan $\tau_0$ stage 22. A suitable lens system 30 provides a collimated beam 36 illuminating the attenuator wafer 34. This beam injects carriers into the conduction band of the material of the wafer 34, producing a plasma on the surface of the attenuator 12 which reduces the transmission of THz radiation effectively "indefinitely" (e.g., 1–10 ns) as compared to the pulse durations being measured. After illumination with the 50 MJ pulse, the transmission of THz power to the attenuator drops by 85%. This falling transmission occurs very quickly—in the time of the order of the optical pulse width (e.g., 130 fs-FWHM). This sharp edge in the transmission of the attenuator provides the temporal resolution for the DES detection system.

The delay stage modulates the delay of the pulse which activates the attenuator as indicated above. The signal which is measured is represented by the equation for $S_\Omega(\tau_0\tau_1)$ which is the equation (4) given above. Looking at that equation, if $\tau_1$ is fixed to some value that maximizes R, scanning $\tau_0$ produces a signal which is proportional to the THz pulse electric field. This signal is represented by the current through the receiver as measured with the lockin amplifier.

Figure 2:
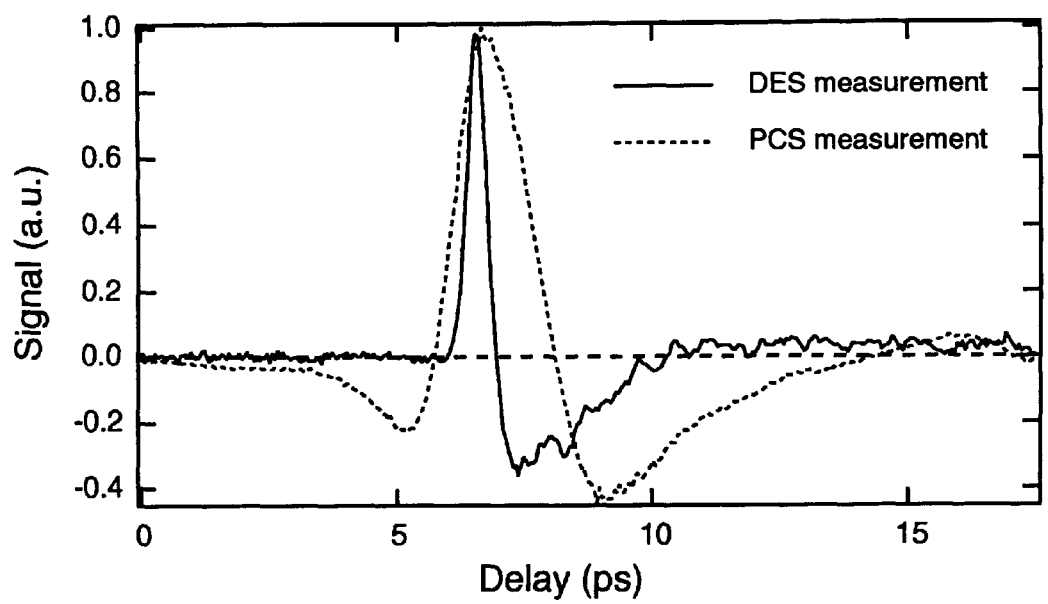
FIG. 2 is a plot which shows the comparison of measurement of a THz pulse by DES is accordance with the invention and by the heretofore available PCS technique.

FIG. 2 shows a comparison the THz pulse as measured by the DES and PCS techniques. Note that the pulse measured by DES has in the illustrated, exemplary case, a FWHM of 400 fs compared to 1.3 ps for the PCS measurement.

Figure 3:
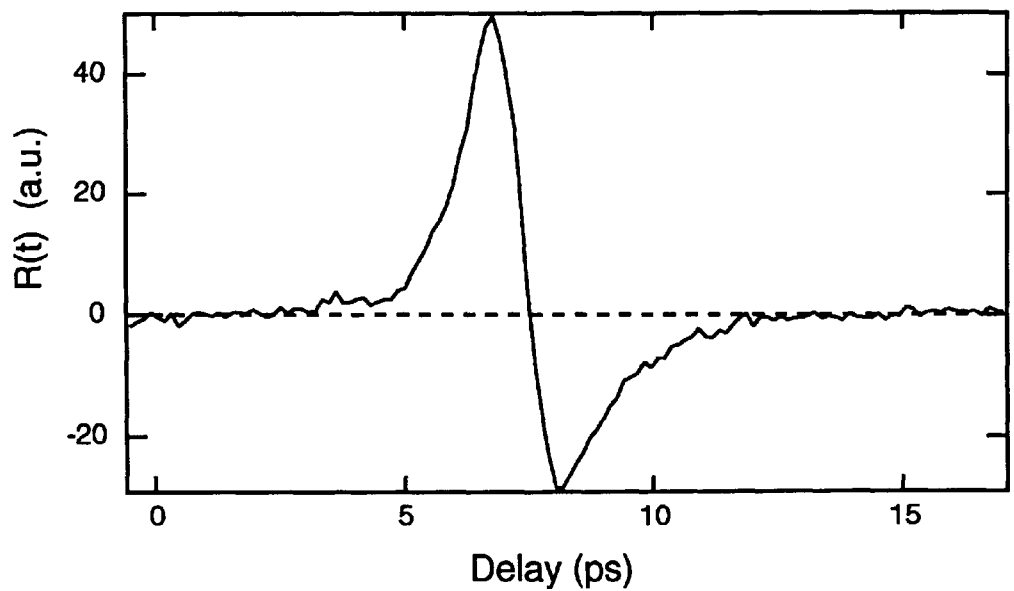
FIG. 3 is a plot showing the temporal response of the photoconductive receiver as measured by means of DES in accordance with the invention.

As shown in equation (4), if $\tau_0$ is fixed to maximize E, scanning $\tau_1$ directly measures R, the receiver's temporal response. This provides a new functionality in the field of ultrafast device characterization. The measured receiver response is shown in FIG. 3. and depends upon the carrier lifetime of the semiconductor material of the receiver 14 and the geometry of the receiver.

It will therefore be apparent that there has been provided an improved dithered edge sampling system suitable for the measurement of ultrashort, THz range pulses. This system utilizes the sharp edge of the transmission via the attenuator of the pulses, to provide temporal resolution, and a receiver which provides sensitivity. DES may be used to measure the temporal response of a photoconductive receiver which is included in the measurement system. Variations and modification of the herein described system, within the scope of the invention, will undoubtedly suggest themselves to those skilled in the art. Accordingly the foregoing description should be taken as illustrative and not in a limiting sense.

What is claimed is:

1. A system for measuring ultrashort infrared electromagnetic pulses which comprises a source of synchronizing optical pulses, a photoconductive attenuator which is subject to activation and a photoconductive receiver via which the pulses to be measured pass, means for dithering the activation of the attenuator by the synchronizing pulses and controlling the time of activation of the receiver by means of the synchronizing pulses, and means for measuring the signal in terms of the current through the receiver.

2. The method of measuring ultrashort electromagnetic pulses which comprises the steps of passing said pulses through a photoconductive attenuator, dithering the turn-on times when said pulses are passed through said attenuator at a rate to provide a signal at the rate of said dithering, said signal corresponding to said pulses and measuring same.

3. The method of claim 2 wherein said rate is much lower than the repetition rate of said pulses.

4. The method of claim 3 wherein said frequency of said pulses is in the terahertz range and said dithering rate is in the kilohertz range.

5. The method of claim 2 further comprising the steps of providing trigger pulses to said attenuator which are dithered at said rate, and receiving said pulses passed through said attenuator synchronously with said gating pulses.

6. The method of claim 5 further comprising the step of scanning in time the occurrence of said dithering and receiving steps.

7. A system for measuring electromagnetic pulses in the terahertz frequency range which comprises an emitter, a photoconductive attenuator, and a receiver providing an output measuring said pulses, said emitter and receiver being at opposite ends of said attenuator, said pulses being applied to said emitter, and a dither stage which triggers said attenuator to pass said pulses to said receiver which provides said output.

8. The system of claim 7 wherein said emitter and receiver are photoconductive antennas.

9. The system of claim 7 wherein a delay stage and said dither stage are operated by synchronizing pulses, said delay stage applying said synchronizing pulses to said dither stage and to said scanner in synchronous time relationship.

10. The system of claim 9 further comprising a modulator for operating said dither stage at a frequency much lower than the repetition rate of said terahertz pulses being measured, a lockin amplifier connected to said receiver operated at said much lower frequency.

11. The system of claim 9 further comprising an actuator connected to said delay stage for scanning the delay of said pulses applied to said dither stage and said receiver.

12. The system of claim 11 wherein said pulses to be measured are provided by a source of said synchronizing pulses.

13. The system of claim 7 further comprising means for applying activating pulses to said receiver at times $\tau_p$ and varying the occurrence of $\tau_p$ thereby characterizing the temporal response of the receiver.

* * * * *